US008906282B2

(12) United States Patent
Chan et al.

(10) Patent No.: US 8,906,282 B2
(45) Date of Patent: Dec. 9, 2014

(54) MICRO-STRUCTURED AND NANO-STRUCTURED SURFACES ON BIODEGRADABLE POLYMERS

(75) Inventors: Bee Eng Mary Chan, Singapore (SG); Jinye Shen, Singapore (SG); Bin He, Singapore (SG); Aiping Zhu, Yangzhou University (CN); Yehai Yan, Singapore (SG); Chee Yoon Yue, Singapore (SG)

(73) Assignee: Nanyang Technological University, Singapore (SG)

( * ) Notice: Subject to any disclaimer, the term of this patent is extended or adjusted under 35 U.S.C. 154(b) by 1645 days.

(21) Appl. No.: 11/176,654

(22) Filed: Jul. 6, 2005

(65) Prior Publication Data

US 2007/0009572 A1    Jan. 11, 2007

(51) Int. Cl.
| | | |
|---|---|---|
| *B27N 3/08* | (2006.01) | |
| *B29C 41/00* | (2006.01) | |
| *B28B 7/30* | (2006.01) | |
| *A61F 2/00* | (2006.01) | |
| *A61K 9/14* | (2006.01) | |
| *B29C 33/38* | (2006.01) | |
| *B29C 33/42* | (2006.01) | |

(52) U.S. Cl.
CPC .......... *B29C 33/3857* (2013.01); *B29C 33/424* (2013.01)
USPC ........... 264/313; 424/426; 424/443; 424/444; 424/486; 264/239; 264/299

(58) Field of Classification Search
None
See application file for complete search history.

(56) References Cited

U.S. PATENT DOCUMENTS

| | | | | |
|---|---|---|---|---|
| 6,770,721 | B1 * | 8/2004 | Kim ............................... | 526/329 |
| 2003/0044311 | A1 * | 3/2003 | Sousa et al. ..................... | 422/22 |
| 2005/0008675 | A1 * | 1/2005 | Bhatia et al. ................... | 424/426 |

FOREIGN PATENT DOCUMENTS

WO    WO 02/36342    *    5/2002    ............. B32B 27/30

OTHER PUBLICATIONS

Charest et al. Biomaterials 25 (2004) pp. 4767-4775.*
Liu, Y. et al., "Charging Effect on Electrical Characteristics of MOS Structures with Si Nanocrystal Distribution in Gate Oxide", Electrochemical and Solid-State Letters, 7 (7) G134-G137 (2004).
Liu, Y. et al., "Charging Effect of Si Nanocrystals in Gate Oxide Near Gate on MOS Capacitance", Electronics Letters, vol. 39, No. 16, pp. 1164-1166, Aug. 7, 2003.
Ng, C.Y. et al., "Modulation of Capacitance Magnitude by Charging/Discharging in Silicon Nanocrystals Distributed throughout the Gate Oxide in Metal-Oxide-Semiconductor Structures", Published Nov. 2004.

* cited by examiner

*Primary Examiner* — Robert A Wax
*Assistant Examiner* — Jeffrey T Palenik
(74) *Attorney, Agent, or Firm* — Blakely Sokoloff Taylor & Zafman LLP

(57) ABSTRACT

In embodiments of the present invention, a biodegradable/biodegradable polymer film may be used as a scaffold for tissue engineering scaffolds for engineering organized organs, such as vascular grafts, for example. In one embodiment, an ultraviolet (UV) resin made from a diacrylated biodegradable oligomer is molded into a flexible scaffold having cavities and/or channels. Channel/cavity size may be on the order of micrometers and/or nanometers, and thus the walls may have high aspect ratios. Smooth muscle cells may be deposited in the channels and because of the high aspect ratios, the cells may align along the channels/cavities as confluence is reached.

20 Claims, 8 Drawing Sheets

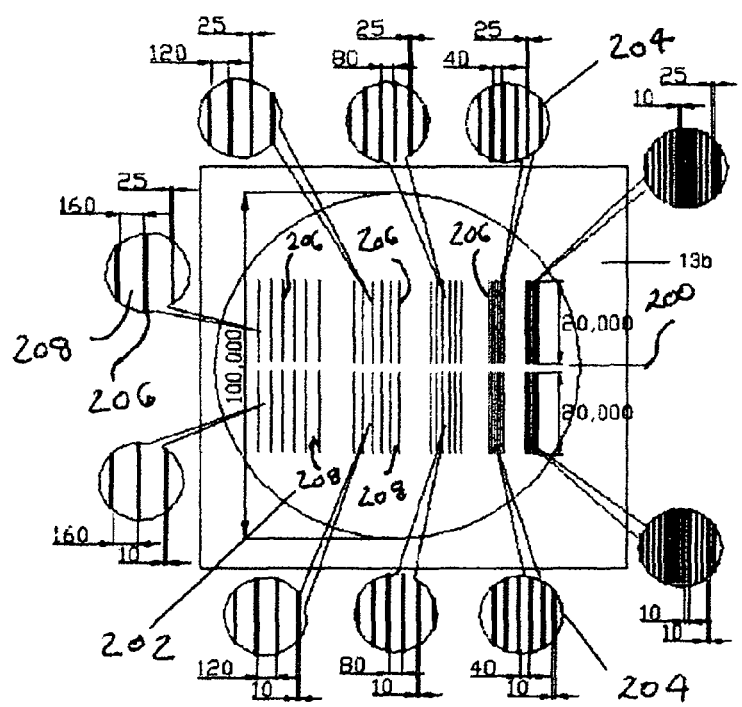
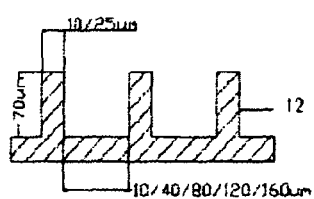
FIG. 2

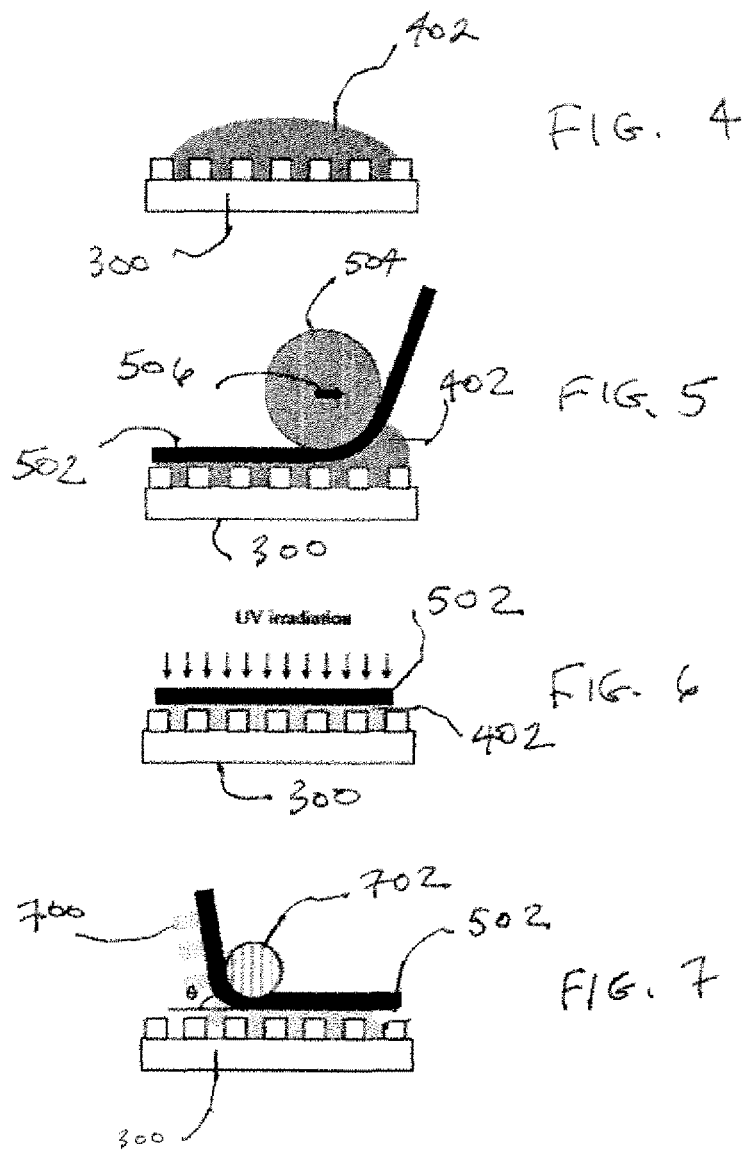

MICRO-STRUCTURED AND NANO-STRUCTURED SURFACES ON BIODEGRADABLE POLYMERS

BACKGROUND

1. Field

Embodiments of the present invention relate to tissue engineering scaffolds and, in particular, to three-dimensional (3D) tissue engineering scaffolds.

2. Discussion of Related Art

In biomedical applications such as tissue engineering, cells grown on a flat surface cannot be used for tissue engineered thick organ constructs since they cannot grow well on top of each other. Scaffolding can be used to provide a three-dimensional (3D) surface, however currently available scaffolding is limited in that some, such as porous scaffolding, for example, cannot be easily used for co-culture and cell positioning for these co-cultures. Porous scaffolds also cannot be used for cells requiring contact guidance. As a result of the limitations of currently available scaffolding the ability to mimic the in vivo micro-environment of tissue cells may be hindered.

SUMMARY OF EMBODIMENTS OF THE INVENTION

For some embodiments of the present invention, a three-dimensional (3D) biodegradable polymeric film includes a structure of micro-channels, micro-cavities, nano-channels, and/or nano-cavities. An individual channel includes walls that may have aspect ratios in a range between 0.1 to 50. The width of an individual channel in the 3D biodegradable polymeric film may be on a micron scale and/or a nanometer scale for some embodiments.

In one embodiment, the 3D biodegradable polymeric film may be seeded with tissue cells, may be formed into a substantially cylindrical shape, may be positioned in proximity to a severed blood vessel, and tissue cells from the severed blood vessel may be allowed to grow into the micro-channels, micro-cavities, nano-channels, and/or nano-cavities of the 3D biodegradable polymeric film. For some embodiments, at least one micro-channel and/or at least one nano-cavity may provide three-dimensional entrapment of the tissue cells. The 3D biodegradable polymeric film may offer the tissue cells contact guidance cues so that the tissue cells may align along the walls in the micro-channels and/or nano-channels. The 3D biodegradable polymeric film also may influence tissue cell differentiation. The 3D biodegradable polymeric film also may be biocompatible.

The 3D biodegradable polymeric film may be fabricated for some embodiments by disposing a biodegradable material in a mold having a structure of micro-channels, micro-cavities, nano-channels, and/or nano-cavities, substantially filling the micro-channels, micro-cavities, nano-channels, and/or nano-cavities with the biodegradable material, disposing a substrate film, such as a polyester film, for example, on the biodegradable material, curing the biodegradable material, removing the cured biodegradable material together with the substrate film from the mold, removing the cured biodegradable material from the substrate film, and sterilizing the cured biodegradable material.

The 3D biodegradable polymeric film may be fabricated for alternative embodiments by disposing a biodegradable material in a carrier substrate, imprinting a mold onto the biodegradable material, the mold having a structure of micro-channels, micro-cavities, nano-channels, and/or nano-cavities, substantially filling the micro-channels, micro-cavities, nano-channels, and/or nano-cavities with the biodegradable material, curing the biodegradable material, removing the mold from the cured biodegradable material, removing the cured biodegradable material together with the carrier substrate from the mold, removing the cured biodegradable material from the carrier substrate, and sterilizing the cured biodegradable material.

For some embodiments of the present invention, the biodegradable material may be a thermosetting polymer, such as one having a backbone including caprolactone, lactide, glycolide, and malic acid. For other embodiments, the biodegradable material may be an ultraviolet (UV) polymer resin, a biodegradable polymer that is liquid at the molding temperature, a hydrogel, or other suitable biodegradable material. For still other embodiments, biodegradable polymers with relatively low viscosity, such as below 10000 mPa, for example, may be suitable.

The biodegradable material may have slightly greater adhesion properties with respect to a substrate film or carrier substrate than to the mold so that the biodegradable material adheres better to the substrate film or carrier substrate than to the mold.

For some embodiments, the biodegradable material may be cured by heating the biodegradable material, such as from sub-ambient temperature to 80 degrees C. or sub-ambient temperature to 100 degrees C., for example. For other embodiments, the biodegradable material may be cured by exposing the biodegradable material to ultraviolet (UV) radiation, or by using a chemical reaction such as a two-part epoxy chemical reaction, an isocyanate chemical reaction, or a siloxane chemical reaction. For some embodiments in which the biodegradable material may be a liquid biodegradable material, a vacuum may be used to assist in substantially filling the micro-channels, micro-cavities, nano-channels, and/or nano-cavities with the liquid biodegradable material.

For embodiments in which the biodegradable material may be cured using UV radiation, unreacted monomer and/or photoinitiator may be extracted from the cured biodegradable material. For example, the cured biodegradable material may be soaked in ethanol to remove approximately 0.1% to 5% of a UV photoinitiator. In one embodiment, the cured biodegradable material may be soaked in methanol to allow a 0.5% 2,2-dimethoxy-2phenylacetophenone photoinitiator to leach out of the cured biodegradable material.

For some embodiments of the present invention, the process used to fabricate the 3D biodegradable polymeric film may be a batch process. For alternative embodiments, the process used to fabricate the 3D biodegradable polymeric film may be a roll-to-roll process.

The substrate film may itself be biodegradable. For embodiments in which the substrate film may be biodegradable, the substrate film may remain adhered to the cured biodegradable material when in use in biomedical applications.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which:

FIG. 2 is a schematic illustration and a cross-section profile of a master mold having a pattern of micro-channels and nano-channels according to an embodiment of the present invention;

FIGS. 4-7 are perspective diagrams illustrating the process of fabricating a flexible 3D biodegradable surface according to an embodiment of the present invention;

DETAILED DESCRIPTION OF EMBODIMENTS OF THE INVENTION

Figure 1:
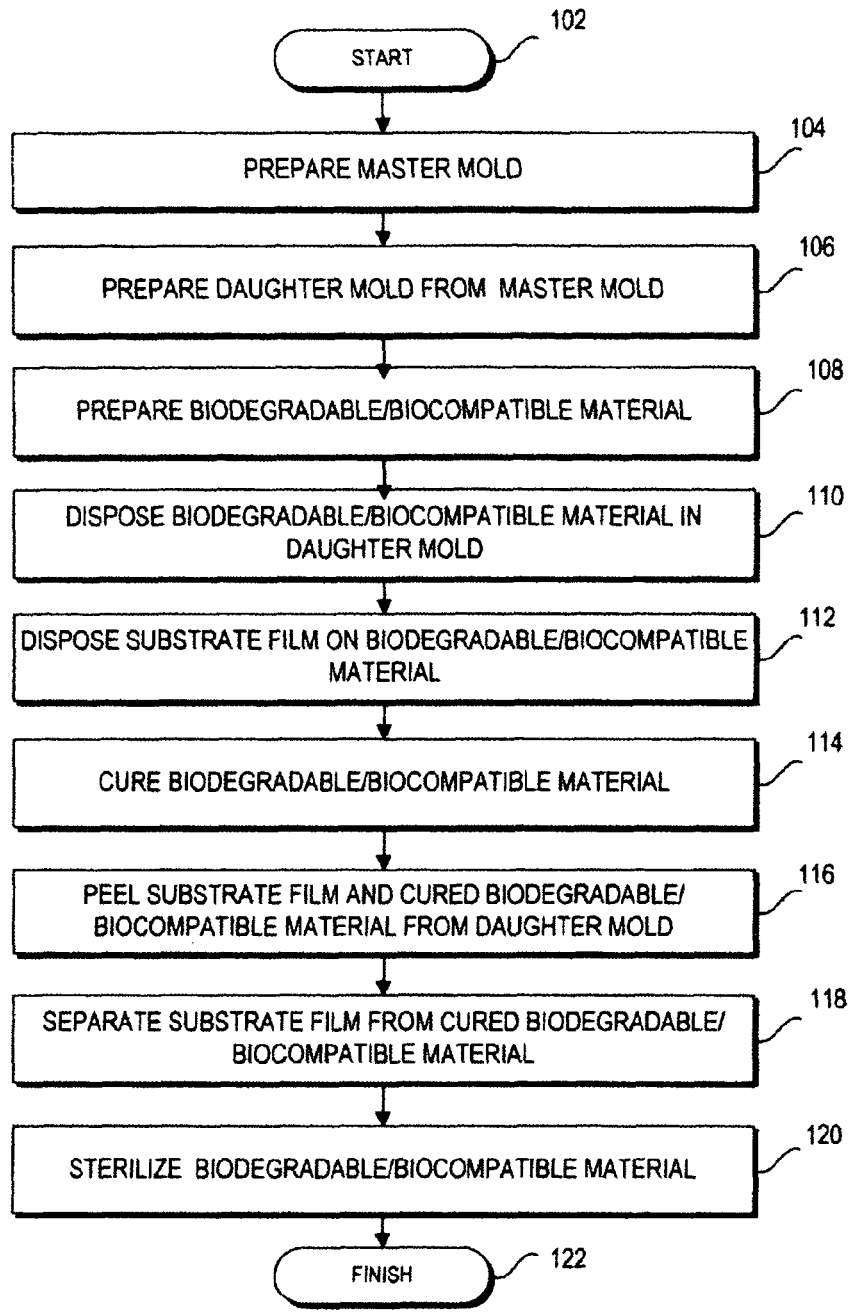
FIG. 1 is a flowchart illustrating a process 100 for fabricating a 3D biodegradable surface according to an embodiment of the present invention.

The inventors have identified a new method of making biodegradable film surfaces that allow improved cell growth and functional morphology in use for a variety of biomedical applications. The biodegradable film surface also may allow multilayer and multi-material constructs to be made for cells to grow into functional organs. The inventors also have developed and used an ultraviolet (UV) replica molding and casting process to produce films that are both biodegradable and have a structure of micro-channels and/or nano-structured.

The three-dimensional (3D) biodegradable polymeric film may be rigid or foldable/flexible. The pores can be spherical, cubic, or highly elongated channels. The orientation, size and shape of these pores can be easily controlled. The 3D biodegradable polymeric film surface may also be coated and/or patterned with conductive materials such as the metals copper (Cu) and/or gold (Au), for example, with a ceramic material such as Indium Tin Oxide, for example, or with biological agents such as protein or peptide, for example, depending on the biomedical application. The method of fabricating the 3D biodegradable polymeric film is also relatively fast to complete and used ambient temperature and low pressure in the production environment.

The method of fabricating the 3D biodegradable polymeric film may produce very high aspect ratio (defined as the ratio of height of a channel wall to the width of the channel wall) micro-structures over a large area. This ability to fabricate high aspect ratio microstructures allows much flexibility in diverse biomedical applications. For example, in sensors and microfluidic applications, the large surface area of the high aspect ratio microstructures is important for increased sensitivity and throughput. Furthermore, the UV embossing process can be made on flexible substrates on a batch basis for small output requirements, or on a roll-to-roll basis for large output requirements. The patterns can also be nano-sized and such nano-patterns have been shown to affect cell growth.

An optional roll-to-roll process allows very large area patterning with the width of the roll-to-roll process limited only by the width of the roller, with the length of the embossed area being almost unlimited. With "press" embossing, highly accurate positional control can be achieved for subsequent post-embossing processing. In addition to the production of simple microstructures, the present invention is applicable to the production of multi-material, laminated and multi-functional microstructures by micro-contact printing, micro-transfer printing, or other post embossing processing.

For some embodiments, different sized micro-channels separated by micro-walls were made. For ease of reference, the widths of micro-channels and micro-walls are denoted by w/c where w is the wall width and c the channel width in microns. For other embodiments, different sized nano-channels separated by nano-walls were made, the widths of nano-channels and nano-walls are denoted in nanometers.

FIG. 1 is a flowchart illustrating a process 100 for fabricating a 3D biodegradable surface according to an embodiment of the present invention. The process 100 begins with a block 102, where control immediately passes to a block 104.

In the block 104, a master mold is prepared. FIG. 2 is a schematic illustration and a cross-section profile of a master mold 200 having a pattern of micro-channels and nano-channels according to an embodiment of the present invention in which the master mold 200 may be made by deep reactive ion etching (DRIE) of a 4-inch (or ~100,000 μm as indicated in FIG. 2) <100> p-type silicon (Si) wafer 202. Size indicators 204 in FIG. 2 is a schematic illustration and a cross-section profile of a master mold 200 having a pattern of micro-channels and nano-channels according to an embodiment of the present invention. For example, FIG. 2 shows a pattern of walls 206 and channels 208 on the silicon wafer 202. The micro-structured master mold 200 may be surface-treated with a passivation step to deposit a Teflon-like polymer on it to aid in clean de-molding.

The example master mold 200 includes ten (10) groups of microstructures each of which may be 50-80 μm deep. Five groups of the structures have some walls 206 that are ten (10) μm wide and the remaining walls 206 are twenty-five (25) μm wide. The walls 206 may be two (2) cm (20,000 μm as indicated in FIG. 2) long. Structures that have some walls that are ten (10) μm wide and some walls that are twenty-five (25) μm wide may be referred to as 10/25 patterns, 10/25 design, 10/25 etc. Likewise, structures that have a walls that are ten (10) μm wide may be referred to as 10/10 patterns, 10/10 design, 10/10 etc. Similarly, structures that have some walls that are ten (10) μm wide and some walls that are one hundred sixty (160) μm wide may be referred to as 10/160 patterns, 10/160 design, 10/160 etc.

The width of the micro-channels 208 may be 10 μm, 40 μm, 80 μm, 120 μm or 160 μm and the distance between two neighboring walls 206 may be varied from 10 μm to 160 μm. In between the two columns of micro-patterns (i.e., 10 micron wall and 25 micron wall patterns on the left and right, respectively), there may be a 2 mm by 4.5 cm flat area, which may be used as control.

A single master mold 200 containing all the 8 wall/channel width combinations was made from SU-8 photolithography on a 500 μm thick silicon wafer. For some embodiments, the silicon wafer 202 is cleaned in piranha solution ($H_2SO_4$:$H_2O_2$=15:1 in volume) at 120° C. for 20 min and then rinsed six times with de-ionized (DI) water. AZ 9260 positive photoresist (distributed by Clariant Corporation) may be spin-coated on the wafer 202 for subsequent use as an etching mask. The spin speed may be approximately 2000 rpm and the resulting thickness of the photoresist may be 7.5±0.5 μm. The photoresist may be exposed to 365 nm light through a mask using a Karl Suss MA6 mask aligner (intensity: 9.3 mW/cm$^2$) for 30 seconds and then developed in AZ 421K for approximately 2 min. The patterned wafer 202 may be baked at 120° C. for 10 min. The photolithography process produces a patterned 7 μm thick photoresist mask needed for subsequent DRIE etching of high aspect ratio silicon structures of about 70 μm depth.

The photoresist-patterned silicon wafer 200 may be etched using the Surface Technology System (STS) multiplex DRIE system. The plasma is generated by an eight hundred W radio-frequency (RF) generator (frequency: 13.56 MHz) and the plasma is applied on a coil while another thirteen W plasma is applied on the sample platen during the etching step. In the time-multiplexed etching process, a mixture of $SF_6$/$O_2$ (130 standard cubic centimeters per minute (sccm)/13 sccm) may be used for each etching cycle, lasting fourteen seconds. During the etching cycle, the process chamber may be maintained at a pressure of twenty mTorr. Then $C_4F_8$ (100 sccm) may be used for the passivation cycle, lasting eight seconds, using eight hundred W plasma. The etching and passivation process may be alternated until the desired etching depth is reached. An average etching rate of 2.8 μm/min with almost vertically etched silicon structure sidewalls may be obtained using this process. The entire etching/passivation process may last twenty-five minutes. The process is done continuously to attain good anisotropy.

After the etching/passivation process is finished, the photoresist on the silicon may be removed using oxygen plasma treatment for twenty minutes using a reactive ion etching machine such as a Technics Micro-RIE Series 800-II RIE machine, for example. The parameters for stripping the resist are set to power=250 W, flow rate=10 sccm, and gas pressure=130 mTorr. $C_4F_8$ may then be used for the passivation using the DRIE system. The plasma power, $C_4F_8$ flow rate, and pressure in the chamber may be 300 W, 100 sccm, and 26 mTorr, respectively, and the duration may be 90 sec.

Figure 3:
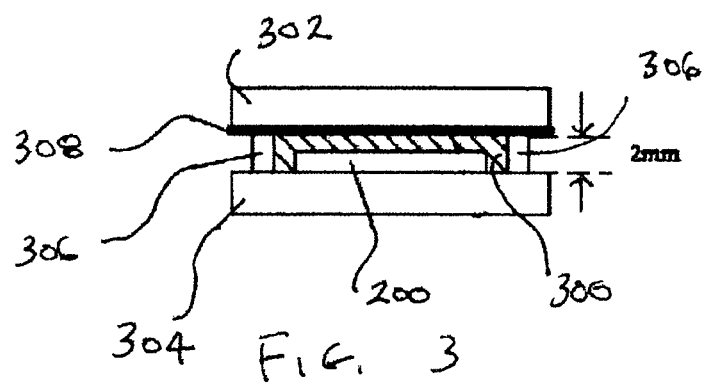
FIG. 3 is a schematic diagram of fabricating a polydimethylsiloxane (PDMS) daughter mold from a master mold according to an embodiment of the present invention.

In a block 106, a daughter mold, such as a polydimethylsiloxane (PDMS) mold, for example, may be fabricated from the master mold 200. FIG. 3 is a schematic diagram illustrating fabrication of a polydimethylsiloxane (PDMS) daughter mold 300 from the master mold 200 according to an embodiment of the present invention. For some embodiments, preparation of a silicone rubber elastomer base for the daughter mold 300 uses Silastic J silicone elastomer base and its curing agent that may be mixed at the ratio of 10:1 according to Dow Corning Corporation instruction. The mixture may be stirred by a mechanical rod mixer at two hundred rpm for about ten minutes. Once thoroughly mixed, the mixture may be put into a vacuum oven to degas at zero atmosphere pressure for approximately twenty minutes. The mixture of silicone rubber is then carefully poured onto the master mold 200 to avoid creating any more air bubbles. The assembly is left standing until the silicone rubber mixture covers the entire master mold 200.

Bubbles may be removed from liquid rubber because the bubbles may prevent the liquid rubber from filling up the channels on the master mold 200 and may lead to defects in the daughter mold 300 after cure. To remove bubbles, the assembly may be put into a vacuum oven at zero atmosphere pressure for thirty minutes for degassing again until no bubbles are visibly observed.

The liquid rubber for the daughter mold 300 is poured into the master mold 200. Both molds 200 and 300 may be sandwiched by two glass sheets 302 and 304, which may be separated by spacers 306. The spacers 306 may be eleven centimeters by eleven centimeters cut out of Teflon that has a two millimeter thickness. Each spacer 306 may be attached to the glass sheet 304. The glass sheet 304 may be used as rigid backing for the master mold 200. The spacers 306 may be attached to the glass sheet 304 by double-side tape around the mold 200.

In direct contact with the liquid rubber is a film 308, such as Melinex® 454, and may be used to cover the liquid rubber before the glass sheet 302 is pressed onto it. The film 308 may be used to prevent the cured silicone rubber mold 300 from adhering to the glass sheet 302, so that the glass sheet 302 may be peeled from the master mold 200 easily after the liquid rubber is cured into the daughter mold 300.

The resulting assembly may be clamped tightly by each of the two glass sheets 302 and 304 and heated to 65° C. for four hours to harden the liquid rubber into the daughter mold 300. This curing step should be sufficient to make the daughter mold 300 attain adequate mechanical strength to resist breaking during removal from the master mold 200. After peeling the daughter mold 300 out of the assembly, the daughter mold 300 may heated at 80° C. for a further two hours.

In a block 108, the biodegradable material used for the three-dimensional biodegradable surface may be prepared. For some embodiments, poly(caprolactone-r-L-lactide-r-glycolide) (PCLLGA) diacrylate was prepared by the ring opening polymerization of ϵ-caprolactone, L-lactide and glycolide with tetra(ethylene glycol) and stannous octoate as the initiator and catalyst respectively. The polymer was designed with a molecular weight of 6200 and the ratio of CL/LA/GA was 60:20:20. The synthesis procedure is as follows.

0.91 g (0.0047 mol) tetra(ethylene glycol), 4.32 g L-lactide, 3.48 g glycolide and 20.52 g ϵ-caprolactone, and stannous octoate (1/1000 of the total weight) may be added into a 100 ml round-bottomed flask equipped with a stirring bar and high-vacuum stopcock which may be connected to a dual bank manifold with one end connected to vacuum pump while another to argon gas. Polymerization may be carried out under stirring for 24 hours at 145° C. under argon atmosphere after 3 purging cycles with argon gas. The reaction mixture may be cooled to room temperature, and precipitated in heptane and diethyl ether and dried at 45° C. under reduced pressure to give a clear viscous liquid.

The isolated polymer may be dissolved in dichloromethane (100 ml/10 g solid) in a three-neck round-bottomed flask and cooled to 0° C. in an ice bath. 1.75 g (0.019 mol) acyloyl chloride and 1.95 g (0.019 mol) triethylamine dissolved in dichloromethane (20 ml) were added dropwise into the flask. The mixture may be reacted at 0° C. for 6 hours and then at room temperature for 18 hours. Dichloromethane may be removed by rotary evaporation and the yield precipitated in diethyl ether twice to remove the excess acryloyl chloride and triethylamine. The viscous oil may be dissolved in tetrahydrofuran and triethylamine hydrochloride allowed to precipitate in the solution for twenty-four hours. Then the solution may be filtrated and tetrahydrofuran removed by rotary evaporation. The viscous oil may be precipitated in ethanol twice to remove the remaining triethyamine hydrochloride and precipitated in diethyl ether to afford diacrylated polymers. The excess diethyl ether may be removed under reduced pressure at 65° C. for twenty-four hours. The obtained macromers may be clear light yellow viscous liquid.

The diacrylated polymer according to one embodiment may be characterized by nuclear magnetic resonance ($^1$H-NMR) on a Bruker DMX-300 spectrometer at 300 MHz using $CDCl_3$ as a solvent, Fourier transform infrared (FTIR) spectroscopy on a Nicolet 560 spectrometer over the wavenumber range 4000-400 $cm^{-1}$, gel permeation chromatograph (GPC) on an Agilent 1000 differential refractometer HPLC system using tetrahydrofuran as eluent at a flow rate of 1.0 ml/min, and differential scanning calorimetry (DSC) (TA DSC 2920 Modulated DSC) running double cycles from −80° C. to 80° C. with a heating rate of 20° C./min and cooling rate of 10° C./min under nitrogen atmosphere.

In a block 110, the biodegradable material may be disposed in the mold 300 and the biodegradable material may substantially fill the mold 300. FIG. 4 illustrates biodegradable material 402 disposed in the mold 300 according to an embodiment of the present invention. In the illustrated embodiment, the biodegradable material 402 substantially fills the micro-channels, micro-cavities, nano-channels, and/or nano-cavities in the mold 300. For some embodiments, UV resin may be dispensed onto the mold 300, allowed to spread in an oven set at 65° C., and degassed in a vacuum oven at zero atmospheres at 65° C. to remove air bubbles and promote filling of the channels in the mold 300. Capillary action may facilitate channel filling. A vacuum also may facilitate channel filling.

In a block 112, a substrate film may be disposed on the biodegradable material. FIG. 5 illustrates a substrate film 502 disposed on the biodegradable material 402 using a roller 504, such as a wire rod coater No. 28, for example, in the direction indicated by an arrow 506 according to an embodiment of the present invention. For some embodiments, a polyester film (Melinex® 454 DuPont Teijin Films, 125 µm thick) may be carefully overlaid onto the biodegradable material to avoid the creation of any air bubbles. The substrate film 502 may have marginal adhesion to the biodegradable material 402 so that the biodegradable material 402 may adhere to the substrate 502 more strongly than to the mold 300 or the mold 200 but may be easily peeled from the mold 300 or mold 200 during de-molding.

In a block 114, the biodegradable material 402 may be cured or polymerized. For some embodiments, the biodegradable material may be cured using heat.

For some embodiments, the biodegradable material mixed with a photoinitiator may be cured by exposing the biodegradable material to ultraviolet (UV) radiation. For example, diacrylated macromer may be stirred for 2 hours at 65° C. with 0.5 wt % of 2,2-dimethoxy-2phenylacetophenone (Irgacure 651 photoinitiator) (CIBA Chemicals) predissolved in butanone (10% Irgacure 651 in Butanone). The biodegradable material 402 may be polymerized under 365 nm UV for ten minutes. The UV source may be a flood UV exposure system with an Hg-lamp, such as a 350 W Mercury lamp of a mask aligner system supplied by SUSS MicroTech, Germany, for example. Unreacted monomer and/or photoinitiator and/or catalyst and/or solvent may be extracted from the cured biodegradable material 402. For example, excess butanone may be removed under reduced pressure at 65° C. for 2 hours.

For other embodiments, the biodegradable material may be cured using a chemical reaction such as a two-part epoxy chemical reaction, an isocyanate chemical reaction, or a siloxane chemical reaction, for example.

In a block 116, the cured biodegradable material and the substrate film 502 may be removed from the mold 300. For example, FIG. 7 shows cured biodegradable material 700 and the substrate film 502 being carefully peeled from the mold 300 using a roller 702 according to an embodiment of the present invention. Because the cured biodegradable material 700 may have slightly greater adhesion properties with respect to the substrate film 502 than to the mold 300, the cured biodegradable material 700 adheres better to the substrate film 502 than to the mold 300. As a result, the cured biodegradable material 700 and the substrate film 502 peel off of the mold 300 together.

In a block 118, the cured biodegradable material 700 and the substrate film 502 may be separated from each other leaving the cured biodegradable material 700 for use as the three-dimensional (3D) biodegradable film in biomedical applications. For embodiments in which the substrate film 502 may be biocompatible and biodegradable, the substrate film 502 may remain adhered to the cured biodegradable material 700 when the cured biodegradable material 700 is to be used as the three-dimensional (3D) biodegradable film in biomedical applications.

In a block 120, the biodegradable material 700 may be sterilized. For some embodiments, the biodegradable material 700 was soaked in ethanol for twenty-four hours to sterilize the biodegradable material 700. The resulting film may be composed entirely of biodegradable and cytocompatible material.

In a block 122, the process 100 finishes.

Figure 8:
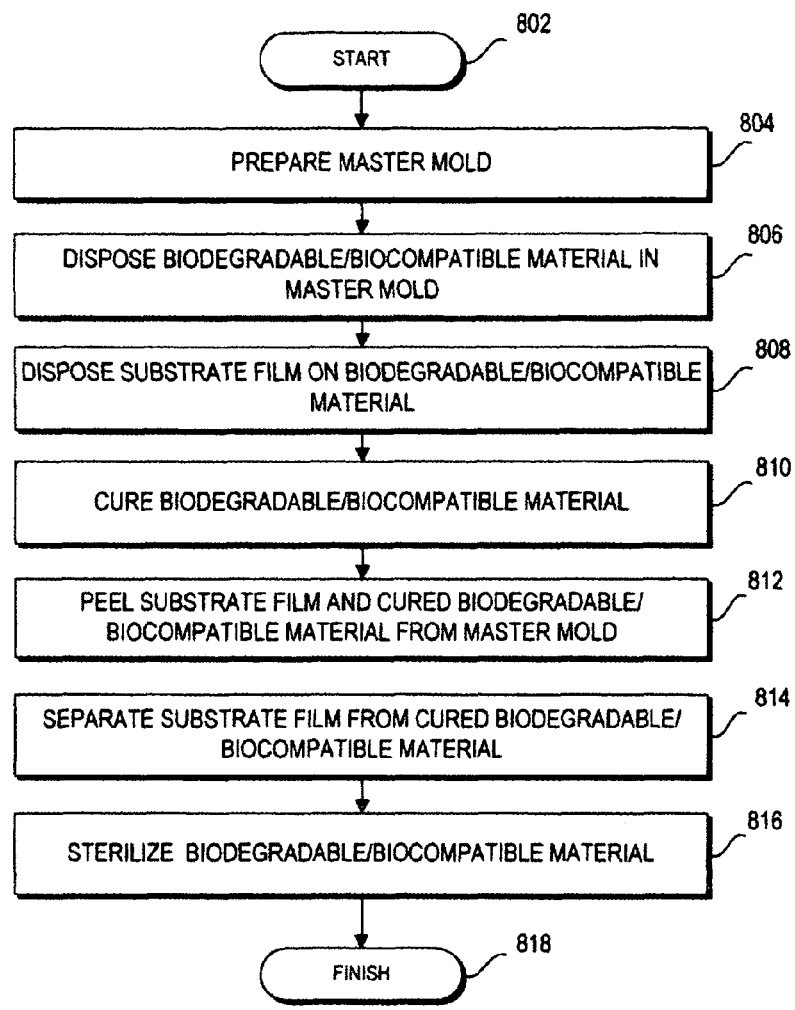
FIG. 8 is a flowchart illustrating a process for fabricating a 3D biodegradable surface according to an alternative embodiment of the present invention.

FIG. 8 is a flowchart illustrating a process for fabricating a three-dimensional (3D) biodegradable film according to an alternative embodiment of the present invention in which the pattern on the biodegradable film may be 10/10, where all the groups of structures have walls that are ten (10) µm wide. Because the PDMS mold 300 may not be suitable for such a small pattern of microstructures, the 10/10 pattern may be directly replicated from the master mold 200.

The process 800 begins with a block 802, wherein control passes to a block 804 in which a master mold 200 having the 10/10 pattern is prepared.

In a block 806, the biodegradable material 402 may be directly poured into the master mold 200 and allowed to spread in a oven set at 65° C. and degassed in a vacuum oven at 0 atmospheres at 65° C. to remove air bubbles and assist the resin formulation to fill the micro-channels.

In a block 808, the substrate film 502 may be carefully placed on the biodegradable material 402 to avoid the creation of air bubbles.

In a block 810, the biodegradable material 402 may be cured and under U light for 10 minutes.

In a block 812, the embossed, cured biodegradable material 700 and the substrate film 502 may be carefully removed from the mold 200.

In a block 814, the substrate film 502 may be removed from the biodegradable material 700.

In a block 816, the biodegradable material 700 may be sterilized.

In a block 818, the process 800 finishes.

For some embodiments, a $CF_4$ plasma modified PDMS mold may be used. PDMS rubber may be cleaned sequentially in ultrasonic baths of acetone, ethanol and doubly deionized water each for fifteen minutes. Plasma fluorination of the clean cured PDMS surface may be carried out in a Technics 800-II Series Reactive Ion Etching System equipped with a 700 W solid state radio frequency generator operating at 13.56 MHz. The empty plasma chamber may be scrubbed with isopropanol, dried, and plasma cleaned for 30 min using high power (350 W) and an Ar flow rate of 21.3 sccm.

After cleaning, the chamber may be opened and the sample to be fluorinated may be introduced. The chamber may be closed, then purged with $N_2$ and evacuated to a base pressure of 30 mtorr before Ar gas is introduced at a flow rate of 21.3 sccm. Subsequently, the glow discharge may be ignited at 200 W. After a 5 min Ar plasma treatment, the power supply may be switched off and the system evacuated to the base pressure again. Tetrafluoromethane ($CF_4$) gas may be introduced into the chamber at a flow rate of 13.4 sccm and the plasma ignited at 70 W and continued for five minutes.

Upon completion of $CF_4$ plasma treatment, the power supply may be switched off while $CF_4$ gas is allowed to continue to flow through the chamber for an additional five minutes prior to venting to atmospheric pressure with $N_2$.

An alternative process for fabricating a biodegradable film according to embodiments of the present invention utilizes the $CF_4$ plasma modified PDMS mold, which may measure approximately 2.5 cm long by 2.5 cm wide by 1 mm thick. The $CF_4$ plasma modified PDMS mold also may have channels that are 45 μm wide by 45 μm deep by 2 cm long.

In this alternative process, the $CF_4$ plasma modified PDMS mold may be placed on a flat surface. The UV formulation, made of 30% PCL-b-PEG-b-PCL-DA (poly(caprolactone-b-ethylene glycol-b-caprolactone) diacrylate) (Mn=3660, Mw=4800, Mn of PEG=2000), 0.3% 12959 and 69.7% water, may be dispensed onto the $CF_4$ plasma modified PDMS mold. The mixture may be degassed using ultrasonic agitation for about thirty minutes and allowed to spread over the whole $CF_4$ plasma modified PDMS mold area. A silane treated glass cover may be gently placed onto the mixture and pressed down onto it with a 1.5 cm diameter steel rod rolled by hand over the glass. The mold/formulation/cover assembly may then be UV-irradiated for twenty minutes with an Oriel 68810 Arc Lamp Power Supply equipped with a Digital Exposure Control and a 500 W mercury halide lamp (365 nm wavelength, 2 mW/cm$^2$ intensity), for example, for twenty minutes to cross-link the formulation and produce a hydrogel in the $CF_4$ plasma modified PDMS mold. After UV polymerization, the $CF_4$ plasma modified PDMS mold may be slowly peeled from the hydrogel/glass complex with a small peeling angle of a few degrees. Patterned hydrogel film may then be successfully de-molded from the $CF_4$ plasma modified PDMS mold.

Figure 10:
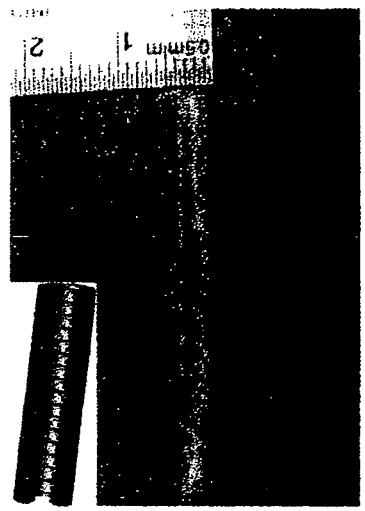
FIG. 10 is a digital photograph of the 3D biodegradable surface depicted in FIG. 9 formed into a tubular or cylindrical shape according to an embodiment of the present invention.
Figure 9:
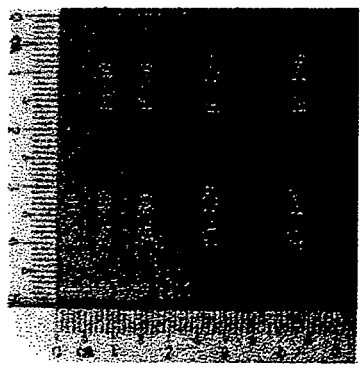
FIG. 9 is a scanning electron micrograph (SEM) of a 3D biodegradable surface according to an embodiment of the present invention.

For some embodiments, large area (5 cm×5 cm) patterned biodegradable films 700 with nine groups of structures (specifically 10/40, 10/80, 10/120, 10/160, 25/10, 25/40, 25/80, 25/120, 25/160) were successfully made. FIG. 9 shows the large area patterning. The patterned flexible biodegradable film was rolled into a tubular structure and sealed using by UV hardening of PCLGLA diacrylate to form an adhesive at the film edge. FIG. 10 shows a tubular structure according to an embodiment of the present invention, which may be used for tissue engineering of small diameter blood vessels as well as other organs such as esophagus or intestine.

Figure 12:
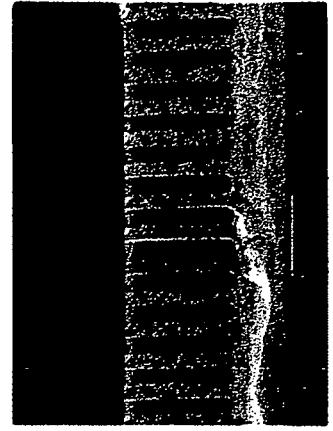
FIG. 12 is a SEM picture of an isometric diagram of a 10/10 mold according to an embodiment of the present invention.
Figure 13:
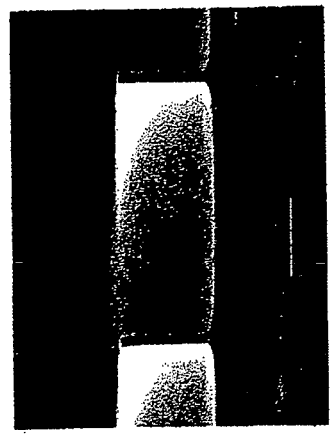
FIG. 13 is a SEM picture of a cross-section diagram of a 10/160 patterned biodegradable film fabricated using UV curing according to an embodiment of the present invention.
Figure 11:
FIG. 11 is a SEM picture of a cross-section diagram of a 10/10 patterned biodegradable film fabricated using UV curing according to an embodiment of the present invention.
Figure 14:
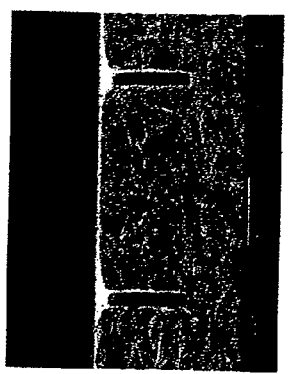
FIG. 14 is a SEM picture of an isometric diagram of a 10/160 mold according to an embodiment of the present invention.

The mold and the UV embossed patterns were examined with scanning electron microscopy (SEM) and the cross-sections were also examined to measure the dimensions of each pattern. The structure of the patterned biodegradable films may be assessed by SEM after being coated with a thin layer of gold. FIG. 11 is a SEM picture of a cross-section diagram of a 10/10 patterned biodegradable film fabricated using UV curing. FIG. 12 is a SEM picture of a cross-section diagram of a 10/10 mold 300. FIG. 13 is a SEM picture of a cross-section diagram of a 10/160 patterned biodegradable film fabricated using UV curing. FIG. 14 is a SEM picture of a cross-section diagram of a 10/160 mold 300.

The dimensions of the replicated PCLLGA structures were compared with those of the PDMS mold 300 or silicon master mold 200. Table 1 illustrates the comparison. Average dimensions of the patterns are measured from ten points. The results are expressed as average±standard deviation.). Δdimension= (mold)−dimension (embossing). Measurements are in microns.

TABLE 1

| Design | Wall Width | Channel Width | Wall Height | Aspect Ratio |
|---|---|---|---|---|
| 10/10 | 10.0 ± 1.1 | 8.7 ± 1.0 | 62.9 ± 1.0 | 6.3 |
| 10/40 | 7.3 ± 0.3 | 39.6 ± 0.5 | 63.3 ± 1.7 | 8.7 |
| 10/80 | 6.9 ± 0.3 | 77.1 ± 0.7 | 60.8 ± 1.2 | 8.8 |
| 10/120 | 6.7 ± 0.2 | 115.7 ± 1.3 | 58.0 ± 1.5 | 8.7 |
| 10/160 | 7.0 ± 0.3 | 153.3 ± 0.9 | 61.2 ± 1.4 | 8.7 |
| 25/10 | 19.6 ± 0.6 | 12.2 ± 0.7 | 66.8 ± 1.7 | 3.4 |
| 25/40 | 19.2 ± 0.3 | 41.3 ± 0.7 | 68.4 ± 1.4 | 3.6 |
| 25/80 | 20.6 ± 0.6 | 79.2 ± 1.5 | 65.9 ± 1.9 | 3.2 |
| 25/120 | 20.5 ± 1.1 | 117.2 ± 1.2 | 62.7 ± 3.5 | 3.1 |
| 25/160 | 20.2 ± 0.9 | 155.2 ± 1.8 | 64.5 ± 4.8 | 3.2 |

As Table 1 indicates, the 10/10 pattern dimensions were relatively accurately replicated from the silicon master mold 200. The small discrepancy between the mold 200 and embossing dimensions (Δ) was due to resin polymerization shrinkage. For the patterns replicated from the PDMS mold 300, such as the 10/160 pattern, for example, there were larger differences between the UV embossed pattern and the corresponding PDMS mold 300. This was due to the non-wetting nature of the PDMS mold 300 which was essential for easy de-molding. However, the replication fidelity was sufficiently good for use in tissue engineering. An aspect ratio of 8.7 can be achieved for the walls by this method and such high aspect ratio has not been reported before in the micro/nano-molding of biodegradable polymers.

For some embodiments, the patterned biodegradable films 700 were used as tissue scaffolds in which we investigated the effects of channel geometry on smooth muscle cell shape and orientation. Smooth muscle cells and sometimes skeletal muscle cells (SMCs) were seeded onto the biodegradable patterned films. For some embodiments, at least one microchannel and/or at least one nano-cavity provided three-dimensional entrapment of tissue cells. The SMCs survived and in some cases flourished and were imaged at various culture periods.

For example, A7r5 smooth muscle cell from thoracic aorta, ATCC CRL-1444 were used. Micropatterned films were cut into 1.5 cm diameter discs and sterilized in 70% ethanol (30% ddH$_2$O) for twenty-four hours. Before cell seeding, biodegradable patterned films were moved to twenty-four-well culture plate and equilibrated with phosphate buffered saline (PBS) for thirty minutes. Then smooth muscle cells together with culture medium were added to the plate (10000 cells/cm$^2$). The medium was refreshed every three days.

At certain time points, phase contrast images were taken using a ZEISS inverted microscope. The cells after four days' and seven days' culture were also examined with SEM. For SEM analysis, the cells are fixed. The biodegradable patterned films with SMCs were rinsed three times with PBS. The cells were then fixed with 2.5% glutaraldehyde for four hours at room temperature. After thorough washing with PBS, the fixed membranes were dehydrated in graded ethanol series (55%, 70%, 80%, 90%, 95%, 100%) each for thirty minutes. After being coated with a thin layer of gold using a sputter coater, the cells were observed with SEM.

Figure 16:
FIG. 16 is SEM picture of smooth muscle cells on a 10/10 patterned biodegradable film after seven day's culture according to an embodiment of the present invention.
Figure 15:
FIG. 15 is SEM picture of smooth muscle cells on a 10/10 patterned biodegradable film after four day's culture according to an embodiment of the present invention.

FIG. 15 is SEM picture of smooth muscle cells on a 10/10 patterned biodegradable film after four day's culture according to an embodiment of the present invention. FIG. 16 is SEM picture of smooth muscle cells on a 10/10 patterned biodegradable film after seven day's culture according to an embodiment of the present invention.

Figure 19:
FIG. 19 is a magnification of the area in the circle 3202 in the SEM picture depicted in FIG. 18 according to an embodiment of the present invention.
Figure 18:
FIG. 18 is SEM picture of smooth muscle cells on a 25/160 patterned biodegradable film after seven day's culture according to an embodiment of the present invention.
Figure 17:
FIG. 17 is SEM picture of smooth muscle cells on a 25/160 patterned biodegradable film after four day's culture according to an embodiment of the present invention.

FIG. 17 is SEM picture of smooth muscle cells on a 25/160 patterned biodegradable film after four day's culture according to an embodiment of the present invention. FIG. 18 is SEM picture of smooth muscle cells on a 25/160 patterned biodegradable film after seven day's culture according to an embodiment of the present invention. FIG. 19 is a magnification of the area in the circle 1802 in the SEM picture depicted in FIG. 18.

For some embodiments, smooth muscle cells align along the direction of the channel and exhibit an differentiated, elongated morphology similar to those of smooth muscle cells in vivo. However, the cell density is low in these narrow channels, even after seven days.

For other embodiments, cells may align along the direction of the channel and show an elongated morphology, which suggests the possibility of the cells growing into an organized tissue with this kind of scaffold.

Cells also exhibit spontaneous growth into elongated morphology nearly confluence with patterns on a micro-scale and/or nano-scale. This is an unprecedented and highly encouraging result and suggests that the approach explored here of cell guidance through cell-scale geometrical and mechanical cues is fundamentally sound. It is particularly interesting that the SMCs nearly confluence adopted an elongated morphology even in the wide channels in the presence of presumed prior activity by synthetic phenotype cells.

Figure 21:
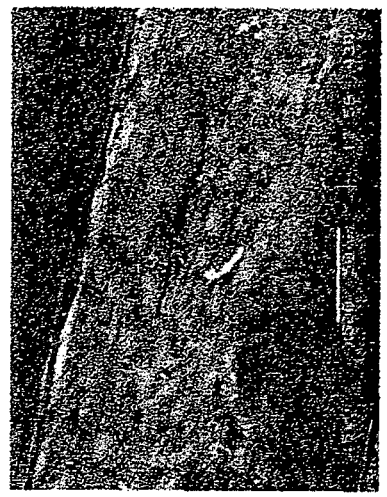
FIGS. 20-21 are ESEM images of smooth muscle cells grown in 160 μm wide channels after twenty days' culture according to an embodiment of the present invention
Figure 20:

FIGS. 20-21 are ESEM images of smooth muscle cells grown in 160 μm wide channels after twenty days' culture according to an embodiment of the present invention. FIGS. 20-21 show that even after twenty days' culture, the cells in the 160 μm wide channels are alive and maintain their elongated morphology. These results demonstrate the possibility of the cells switching from synthetic phenotype to contractile phenotype morphology with increased cell density. Synthetic proliferative morphology promotes cell growth necessary for tissue engineering and the contractile morphology nearing confluence is essential for functional SMCs and the growth of an organized tissue with biodegradable/biocompatible scaffolds fabricated according to embodiments of the present invention. When the SMCs reach confluence in the channel, the cells that are also attached to the sidewall exert significant stress on the walls causing some walls to topple over, as demonstrated in FIG. 18.

If mechanical tension generated within the cytoskeleton of living cells is critical for control of cell shape and function, then it can be hypothesized that the aligned cells experience significant unidirectional and concerted transverse stress producing the observed spindle shaped morphology nearing confluence. The results also suggest that SMCs in the synthetic morphology can be guided into an aligned contractile morphology by mechanical cues in the tissue scaffold. These morpho-orientational cues appear to spontaneously propagate through a confluent cell layer.

The walls of the patterned biodegradable films 700 also physically constrain the SMCs preventing the cell extension even with long term culture (20 days). Such an observation has not been previously reported.

The patterned biodegradable films 700 also may align SMCs on a larger proportion of the surface area. The use of three-dimensional (3D) walls constrain the cells to grow and align along a defined "tissue axis" nearing confluence with long term culture resulting in an aligned "tissue-like" cell sheet, which has not previously been observed. The observed transition from the proliferative synthetic form to the contractile form as confluence is approached enables cell proliferation with eventual desired contractile morphology, a highly desirable sequence of events in the context of tissue engineering of small diameter vascular grafts.

Although embodiments of the present invention may be described with respect to tissue engineering in which the three-dimensional (3D) biodegradable polymeric film may be used to promote, enhance, and/or affect tissue cell growth, proliferation and attachment, embodiments are not so limited. For example, the 3D biodegradable polymeric film may be used in controlled drug delivery to facilitate easy retrieval of capsules and localized delivery to the human subject. The 3D biodegradable polymeric film may be used and diagnostic micro-devices, for example, and/or for localized drug or gene or protein delivery.

In the above description, numerous specific details, such as, for example, particular processes, materials, devices, and so forth, are presented to provide a thorough understanding of embodiments of the invention. One skilled in the relevant art will recognize, however, that the embodiments of the present invention may be practiced without one or more of the specific details, or with other methods, components, etc. In other instances, structures or operations are not shown or described in detail to avoid obscuring the understanding of this description.

Reference throughout this specification to "one embodiment" or "an embodiment" means that a particular feature, structure, process, block, or characteristic described in connection with an embodiment is included in at least one embodiment of the present invention. Thus, the appearance of the phrases "in one embodiment" or "in an embodiment" in various places throughout this specification does not necessarily mean that the phrases all refer to the same embodiment. The particular features, structures, or characteristics may be combined in any suitable manner in one or more embodiments.

The terms used in the following claims should not be construed to limit embodiments of the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method for manufacturing a biodegradable surface, the biodegradable surface being biocompatible with biological agents, the method comprising:
   disposing a biodegradable material in a mold, the mold having a structure of micro-channels and/or nano-channels;
   substantially filling the micro-channels and/or nano-channels with the biodegradable material;
   permanently adhering a flexible biodegradable substrate film onto the biodegradable material;

curing the biodegradable material to form a biodegradable surface including micro-channels and/or nano-channels with high aspect ratio walls;

rolling the cured biodegradable material and the flexible biodegradable substrate film off the mold; and sterilizing the flexible biodegradable substrate film and the cured biodegradable material.

2. A method for manufacturing a biodegradable polymeric film of a biodegradable material, the biodegradable polymeric film being biocompatible with biological agents, the method comprising:

permanently adhering a flexible biodegradable substrate film onto the biodegradable material;

imprinting a mold onto the biodegradable material, the mold having a structure of micro-channels and/or nano-channels;

substantially filling the micro-channels and/or nano-channels with the biodegradable material;

curing the biodegradable material to form a biodegradable surface including micro-channels and/or nano-channels with high aspect ratio walls;

rolling the cured biodegradable material and the flexible biodegradable substrate film off the mold; and sterilizing the flexible biodegradable substrate film and the cured biodegradable material.

3. The method of claim 1 or 2, further comprising using a vacuum to substantially fill the micro-channels and/or nano-channels with a liquid biodegradable material.

4. The method of claim 1 or 2, wherein curing said biodegradable material comprises heating said biodegradable material.

5. The method of claim 1 or 2, wherein curing the biodegradable material comprises exposing the biodegradable material to ultraviolet (UV) radiation.

6. The method of claim 5, further comprising extracting unreacted monomer and/or photoinitiator and/or catalyst from the substantially hardened and/or flexible biodegradable surface or biodegradable polymeric film.

7. The method of claim 6, further comprising soaking the substantially hardened and/or flexible biodegradable surface or polymeric film in ethanol to remove a 0.1% to 5% of UV photoinitiator.

8. The method of claim 1 or 2, wherein curing the biodegradable material comprises subjecting the biodegradable material to a chemical reaction selected from at least one of a two-part epoxy chemical reaction, isocyanate chemical reaction, condensation reaction, or a siloxane chemical reaction.

9. The method of claim 1 or 2, wherein the method is performed by batch process.

10. The method of claim 1 or 2, wherein the method is performed by roll-to-roll process.

11. The method of claim 1 or 2 wherein the mold is a polymer daughter mold formed from a silicon master mold.

12. The method of claim 11 wherein forming the polymer daughter mold from the silicon master mold comprises:

patterning and etching the micro-cavities and/or nano-cavities on a surface of the silicon master mold;

pouring the polymer for the daughter mold onto the surface of the silicon master mold such that the polymer fills the micro-cavities and/or nano-cavities;

sandwiching the silicon master mold and the uncured polymer daughter mold between a pair of glass plates;

curing the polymer daughter mold; and removing the polymer daughter mold from the silicon master mold.

13. The method of claim 12 wherein a non-stick coating is deposited on the surface of the silicon master mold.

14. The method of claim 12, further comprising sandwiching a substrate film between one of the pair of glass plates and the daughter mold.

15. The method of claim 11 wherein the silicon master mold comprises <100> p-type silicon.

16. The method of claim 11 wherein a non-stick coating is deposited on the surface of the silicon master mold.

17. The method of claim 11 wherein the daughter mold is a plasma-fluorinated PDMS mold.

18. The method of claim 1 or 2 wherein the walls of the micro-channels and/or nano-channels have an aspect ratio substantially between 3.1 and 8.8.

19. The method of claim 1 or 2 wherein each of the micro-channels or nano-channels comprises:

a continuous flat bottom having a long dimension and a short dimension; and a pair of spaced-apart continuous walls positioned along the edges of the bottom that run along the long dimension.

20. The method of claim 1 or 2, further comprising coating and/or patterning the biodegradable material with a conductive material, a ceramic material, or biological agents.

* * * * *